United States Patent Office 3,396,626
Patented Aug. 13, 1968

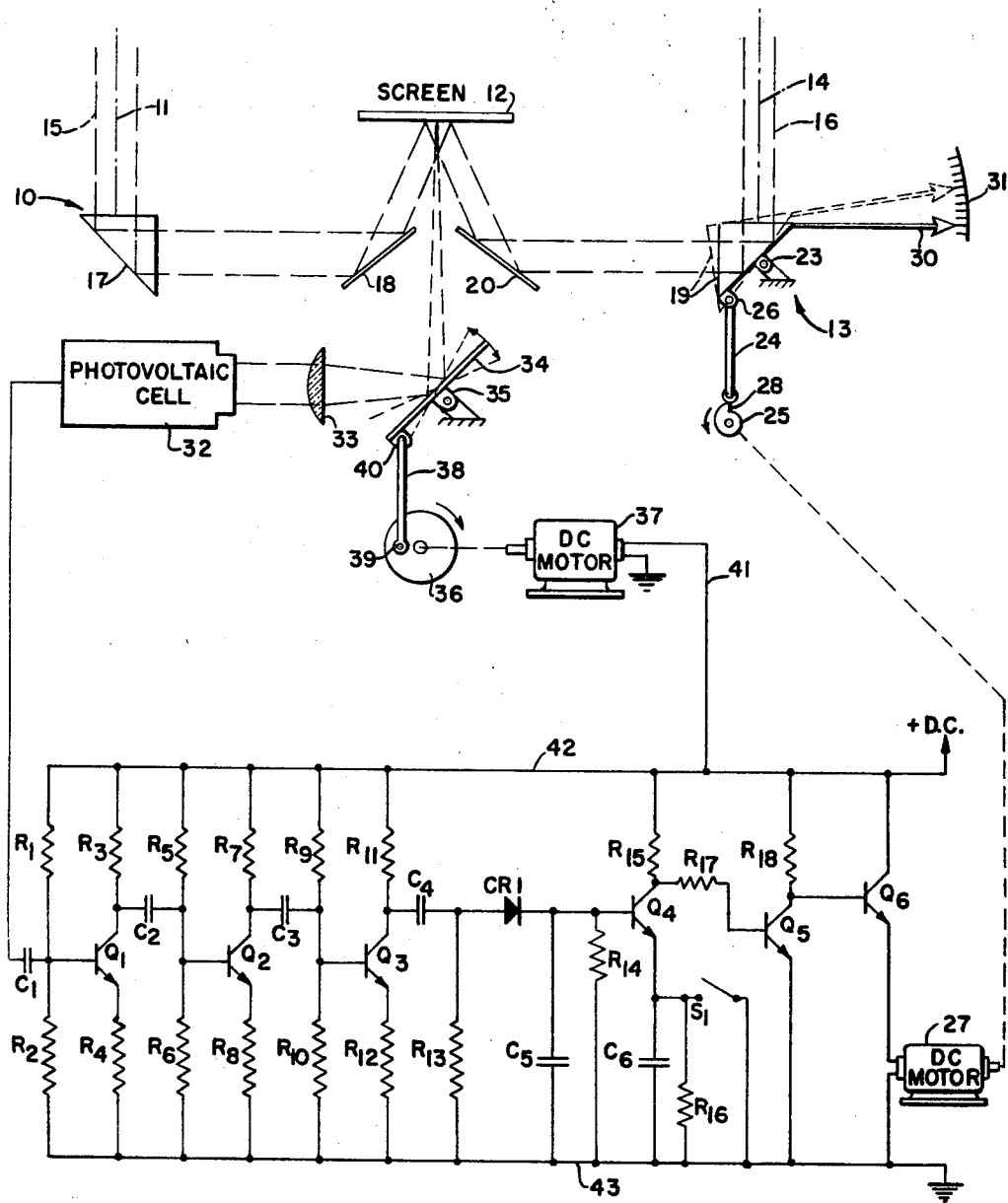

3,396,626
AUTOMATIC RANGE FINDER
Bill B. Hughes, Bloomington, Minn., assignor to Electronic Communications, Inc., St. Petersburg, Fla., a corporation of Delaware
Filed Sept. 27, 1963, Ser. No. 312,181
13 Claims. (Cl. 88—1)

ABSTRACT OF THE DISCLOSURE

An optical image coincident range finder device with means for automatically determining image coincidence. Range is calculated from the angle between the axes of two optical assemblies which project their images upon a common screen. When the object sighted upon is located at the intersection of the axes, the images upon the screen will be coincident. Photoelectric means are used to determine image coincidence by measuring radiation intensity variations across the screen. This is accomplished by an oscillating mirror and lens system which presents to said photoelectric means successive increments of the radiation from the screen resulting from the images superimposed thereon. Coincidence is present when said radiation variations are a maximum. Power means sweep the axis of one optical system along the axis of the other until the axes intersect at the object ranged upon. At this point, coincidence occurs and switch means stop the sweep. The range is then read from suitable means linked to said swept axis.

---

This invention relates to devices for detecting image coincidence, and more particularly to an automatically operating range finder of the image coincidence type.

Most automatic range finders are of the active type, such as radar and similar systems, with reflections of a beam of transmitted energy used to provide a range indication. In addition to their complexity, such systems are not secure; the transmitted energy provides a ready means for detecting their use.

Passive range finders are known in which visible light images from a target are received along two intersecting optical axes through two separate optical systems. The user of the range finder normally varies one of the optical systems manually until matching or coincidence of the two received images upon some sort of optical display indicates to the user that the target is positioned at the intersection of the two optical axes. The range of the target is then the distance to the intersection of the axes, which may be determined by the relative angles of the axes. Such systems, although they are passive (not requiring transmitted energy) and thereby more secure in operation, nevertheless suffer from the disadvantages inherent in any manual system, as compared to an automatic system, in that they are slow, cumbersome, and subject to human error in the determination of image coincidence or image matching. In addition, because of the optical presentation necessary for the determination of image coincidence by the user, they are restricted to use radiation within the visible spectrum.

Accordingly, an object of this invention is to provide a passive range finder of the image coincidence type which is completely automatic in operation and does not depend upon manual manipulation or human judgment in the determination of image coincidence.

It is another object of this invention to provide an automatic passive range finder which is not limited to use with visible light, but which is adaptable for use with any radiation within the electromagnetic spectrum.

It is a further object of this invention to provide an improved system for automatically determining the existence of coincidence in two superimposed radiant images.

According to this invention, as embodied in an automatic optical range finder, optical images are received through two conventional optical channels along two intersecting optical axes. One optical channel and its corresponding axis are fixed, the other optical channel is periodically scanned so that its axis moves through a range of relative angles with respect to the fixed axis. Images received by the two systems are projected in superimposed relation upon a screen. When the two axes intersect at a target, the projected target images coincide and target range is read from a range indicator responsive to the relative angle between the axes.

Image coincidence is detected by means of a photosensitive device which is responsive to the intensity of light radiation from an incremental area, substantially a point upon the screen which is focused upon it by a movable optical channel. This incremental area is oscillated back and forth rapidly across the screen to present a broad sampling of the images upon the screen and the photosensitive device which provides an output voltage which varies with variations in the intensity of radiation from point to point across the screen. When the two images superimposed on the screen are not coincident, the screen presentation is fuzzy or blurred with relatively small variations in radiation intensity, and the voltage variations are accordingly of low amplitude. When the two images are coincident, or focused, there are wide variations in the intensity of radiation from point to point across the screen, and the voltage accordingly has high amplitude fluctuations. When the amplitude of the voltage variations, taken over a time interval to avoid the effect of isolated random peaks, reaches a maximum value, the images are coincident. An electronic circuit containing integrating means detects the existence of such a maximum value and stops the sweep of the movable optical channel, whereupon target range may be read from the indicator.

The invention, and the manner in which it fulfills the above and other objectives, may be understood more clearly by reference to the detailed description below taken in conjunction with the drawing, which is a part of the specification, and which illustrates one embodiment of the invention in a simplified schematic form.

The embodiment of the invention shown in the drawing and described in detail is a passive optical range finder providing automatic range indication upon the coincidence of two optical images. One optical image of a target (not shown) is received by an optical receiving channel generally designated as 10 along a corresponding axis 11 and projected upon screen 12. Optical receiving channel 10, and the direction of its corresponding optical axis 11, are fixed with respect to screen 12. A second optical image is received by optical receiving channel 13, which is movable with respect to screen 12, along its corresponding axis 14 and is likewise projected upon screen 12 superimposed upon the first image. The paths of the received images through the fixed and movable channels 10 and 13 are indicated by dashed lines 15 and 16, respectively. The various conventional lenses and other optical parts which form a part of such optical channels are not shown, for simplicity. Fixed channel 10 comprises basically a fixed prism 17 and a fixed mirror 18, both of which cooperate to bend the received image in the appropriate manner to project it upon screen 12. Movable optical channel 13 comprises basically a movable prism 19 and a fixed mirror 20, which cooperate in a similar manner to bend the received image and to project it upon screen 12 superimposed upon the image projected thereon by fixed channel 10.

Movable prism 19 is mounted for rotation about a pivot point 23. It is driven by a cam follower shaft 24, one end of which rides as a cam follower upon rotary cam 25 and the other end of which is pivotally attached at point 26 to one corner of prism 19. Cam 25 is rotated in a counterclockwise direction by a DC scanning motor 27. As cam 25 turns in a counterclockwise direction, shaft 24 rides upward on the cam periphery of increasing radius, turning prism 19 in a clockwise direction about pivot point 23. When cam 25 has turned far enough so that the end of shaft 24 reaches the sharp radial shoulder 28 of the cam, shaft 24 drops down to the lower portion of the cam surface and prism 19 rapidly returns in a counterclockwise direction to its initial dotted line position. It then recommences its gradual clockwise movement.

Optical receiving channels 10 and 13 are arranged so that their respective optical axes 11 and 14 always intersect at some point. Since the distance between the bases of these axes (where they end in their corresponding prisms) is a constant, the distance of the intersection of the axes from the prisms may be determined from the relative angle which the axes make with each other. Since one axis is fixed, this distance is a function of the angular position of movable axis 14, and is indicated by a pointer 30 which is fixedly attached to prism 19 and cooperates with arcuately arranged range indicia 31. As movable prism 19 described its clockwise sweep, movable axis 14 is correspondingly swept in a clockwise direction. Therefore, when prism 19 and axis 14 are in their most counterclockwise position, axis 14 intersects fixed axis 11 at a point relatively close to the prism (or, generally speaking, close to the range finder) and pointer 30 indicates relatively small range toward the top of range indicia 31. As prism 19 is swept clockwise, the intersection of the two optical axes occurs at a greater distance, as indicated by the position of pointer 13 toward the bottom of range indicia 31.

The range finder operates to obtain target range by adjusting the relative angles of the optical axes so that a selected target appears at their intersection, so that the distance to the intersection of the axes indicated by pointer 30 coincides with target range. In operation, the range finder as a whole is oriented so that the image of a desired target is received along fixed optical axis 11; that is, optical axis 11 is "pointed at" the target. At some point in the scanning of movable axis 14, it intersects the target, and at this point the target appears at the intersection of the two axes and its range is indicated by pointer 30. The appearance of a target at this intersection is indicated by the coincidence of the two target images projected on screen 12. There will not be theoretically perfect coincidence, since images received along two optical axes at slightly different angles will differ slightly and therefore cannot precisely coincide; however, for targets at any reasonable range, the angle of image reception will be so close that the images will be substantially identical, and therefore there will be substantial coincidence upon screen 12.

The remainder of the range finder comprises a light sensitive system and a cooperating electronic circuit which operate to detect image coincidence and which are connected with an electronic switching circuit in a feedback loop to stop DC scanning motor 27 upon the occurrence of such coincidence. Thus the sweep of prism 19 and axis 14 is stopped in a position pointing at the target and pointer 30 cooperates with indicia 31 to provide an indication of the target range.

The unique system used for the detection of image coincidence makes use of the phenomenon that if the images substantially coincide, there is a greater difference in radiation intensity between the bright and dark areas on the screen than if they do not coincide. Thus, if the images displayed on the screen are not identical and coincident, the display is "fuzzy" or unfocused, and the variations in the intensity of light radiated outwardly from the screen are not great. On the other hand, if the images are substantially identical and coincident, the light and dark areas reinforce each other and create large variations in the intensity of radiation from point to point on the screen.

The light sensitive system comprises basically a photovoltaic cell 32, a converging lens 33, and a vibrating mirror 34. Lens 33 focuses an incremental area (shown on the drawing as a point) on screen 12, upon the light receiving area of cell 32, via mirror 34. Screen 12 may be any surface that reflects a substantial portion of the radiation incident upon it. The photovoltaic cell, therefore, is responsive to the intensity of light radiation from an incremental area of screen 12. Vibrating mirror 34 is oscillated about a pivot point 35 by an eccentric wheel 36 driven by DC motor 37 which is directly connected to a source of positive DC by line 41. A connecting rod 38 has one end 39 pivotally connected to eccentric wheel 36 at a point offset from the center of wheel rotation, and the other end 40 pivotally connected to one end of mirror 34. As motor 37 rotates eccentric wheel 36, connecting rod 38 accomplishes the desired vibration of mirror 34. The extent of vibration of the mirror is shown by the limiting dashed line positions. Mirror 34 reflects radiation emanating from screen 12 through lens 33 to photovoltaic cell 32. The position of mirror 34, therefore, controls the particular incremental area of screen 12 to which the photovoltaic cell is responsive. The limits of vibration of mirror 34 are adjusted so that the mirror sweeps the incremental area to which the photovoltaic cell is responsive back and forth in a line across a substantial portion of that part of screen 12 on which the two superimposed images are projected.

The photovoltaic cell provides an output voltage which is a direct function of the intensity of the light radiation incident upon it. Therefore, as mirror 34 causes the incremental area to sweep across screen 12, the output of cell 32 is a varying, or AC voltage having an instantaneous amplitude that is directly proportional to the intensity of radiation from the corresponding incremental screen area upon which the cell is instantaneously focused. When the two images superimposed on screen 12 don't coincide, the variations in radiation intensity as the incremental area is swept across the screen are not too great, and consequently the peak-to-peak variations in the alternating output voltage are relatively small. On the other hand, when the two images are coincident, there are wide variations in the point-to-point radiation intensity, and correspondingly the peak-to-peak amplitude of the voltage variations is high.

The AC output of photovoltaic cell 32 is fed to electronic circuitry where it is amplified, detected, and integrated to provide a varying DC signal which is a function of the amplitude of peak-to-peak variations in the AC voltage taken over a period of time. A maximum point in this DC signal indicates a maximum in the variations in the intensity of radiation over a portion of the superimposed images, and hence indicates the existence of image coincidence. An electronic switching circuit is responsive to a maximum in this DC signal (the condition of image coincidence) and operates to stop DC scanning motor 27.

The AC output voltage from cell 32 is first amplified in a three stage transistor amplifier. The AC voltage is fed from cell 32 through capacitor $C_1$ to the first stage of amplification, a conventional AC transistor amplifier utilizing an NPN transistor $Q_1$. Bias for transistor $Q_1$ is provided by the voltage divider comprising series connected resistors $R_1$ and $R_2$ connected between positive bus 42 which is in turn connected to the source of positive DC, and ground bus 43. The junction of resistors $R_1$ and $R_2$ is connected to capacitor $C_1$ and to the base of transistor $Q_1$.

The collector of transistor $Q_1$ is connected through resistor $R_3$ to positive bus 42, and the emitter through resistor $R_4$ to ground bus 43. The output of transistor $Q_1$ at its collector is connected via coupling capacitor $C_2$ to the base of a similar second AC transistorized amplifier stage. In the second amplifier stage, base bias is provided by the series combination of resistors $R_5$ and $R_6$ connected between positive and ground buses 42 and 43, respectively, and the collector and emitter of second stage NPN transistor $Q_2$ are connected through resistors $R_7$ and $R_8$, respectively, to the positive and ground buses. The output of the second amplifier stage is taken from the collector of transistor $Q_2$ and fed through coupling capacitor $C_3$ to the base of NPN transistor $Q_3$ in the third AC amplification stage. The third stage is similar to the other two, with the series combination of resistors $R_9$ and $R_{10}$ providing base bias and resistors $R_{11}$ and $R_{12}$ being connected in the collector and emitter circuits, respectively.

The output of the third stage of amplification is taken from the collector of transistor of $Q_3$ and fed through coupling capacitor $C_4$ to the anode of semiconductor rectifying diode $CR_1$. Resistor $R_{13}$, connected between the anode of $CR_1$ and ground bus 43, provides a DC path for the diode. The cathode of diode $CR_1$ is connected to one end of filter capacitor $C_5$ which has its other end grounded, and also in parallel with $R_5$. The collector of $Q_4$ is connected through resistor $R_{15}$ to positive bus 42 and its emitter is connected through capacitor $C_6$ in parallel with $R_{16}$ to ground bus 43. A single pole, single throw, normally open switch $S_1$ is connected across capacitor $C_6$. The collector of transistor $Q_{14}$ is connected through resistor $R_{17}$ to the base of NPN transistor $Q_5$. The emitter of $Q_5$ is connected directly to ground bus 43 and its collector is connected through resistor $R_{18}$ to positive bus 42. The collector of transistor $Q_5$ is directly connected to the base of NPN power transistor $Q_6$, which has its collector connected directly to positive bus 35 and its emitter connected to one input of DC scanning motor 27. The emitter circuit of transistor $Q_6$ is completed through DC motor 37 to ground bus 43 via the other input connection to the motor.

The electronic circuitry operates as follows. The three stages of AC amplification is entirely conventional and the amplification of the input AC signal therein requires no explanation. The amplified AC voltage from the collector of transistor $Q_3$ in the last amplifier stage is rectified in diode rectifier $CR_1$ and the resulting positive-going pulses appear on one plate of filter capacitor $C_5$. The positive-going pulses tend to charge the capacitor to their peak value. Capacitor $C_5$, therefore, essentially integrates the rectified pulses appearing at the cathode of the rectifier.

In order to understand the nature of the varying DC voltage appearing at the junction of capacitor $C_5$ and the anode of rectifier $CR_1$ it is necessary to consider the variations in the AC input signal which result from the continuous scanning of variable optical axis 14 and the oscillations of mirror 34. Mirror 34 oscillates rapidly with respect to the scan of optical axis 14, so that the incremental area focused upon cell 32 moves for a substantial distance across the face of screen 12 before there is any significant change in the relationship of the two superimposed images projected thereon. As the optical axis 14 sweeps toward the target the two images projected upon screen 12 come closer and closer toward coincidence, and the peak-to-peak variations in the AC voltage at the output of the amplifier stages increase in amplitude. Since filter capacitor $C_5$ is continually charging toward the maximum value of the rectified DC pulses, which are proportional in amplitude to the peak-to-peak AC variations, the voltage appearing across this capacitor gradually increases in value as optical axis 14 approaches the target and the images approach coincidence. When the images reach coincidence, the increase in peak-to-peak variations in the AC signal stops and the DC voltage across filter capacitor $C_5$ reaches a maximum.

The varying DC voltage across filter capacitor $C_5$ is applied to the base of NPN transistor $Q_4$ in the first stage of the three stage transistorized switching circuit. As the voltage across $C_5$ begins to build up, the resulting positive voltage on the base of transistor $Q_4$ causes it to increase conduction. Since switch $S_1$ is open, conduction current through $Q_4$ commences to charge $C_6$ in the emitter circuit. As long as the voltage on the base continues to increase, it is more positive than the voltage across capacitor $C_6$ (the emitter voltage) and transistor $Q_4$ continues to conduct. When the base voltage stops increasing, that is, reaches a maximum, the emitter capacitor $C_6$ "catches up" and reaches a value equal to the base voltage less the base-to-emitter drop. Immediately after the peak of optical coincidence, $C_5$ begins discharging through $R_{14}$. Also $C_6$ commences to discharge through $R_{16}$ but at a slower rate due to a longer time constant. Since the voltage on the base of transistor $Q_4$ decreases faster than the voltage at the emitter, the transistor becomes nonconductive. At this point transistor $Q_4$ becomes nonconductive.

As long as $Q_4$ is conducting, the voltage on its collector which is coupled through resistor $R_{17}$ to the base of transistor $Q_5$ is at very low positive value, and transistor $Q_5$ is only slightly conductive. There is a substantial voltage drop across transistor $Q_5$ in this condition, and consequently a substantial positive voltage is applied to the base of power transistor $Q_6$, rendering it conductive and operating DC motor 27 in its emitter circuit. When $Q_4$ stops conducting, however, the voltage on its collector rises abruptly to the positive value of positive bus 42, bringing transistor $Q_5$ into full conduction. With transistor $Q_5$ conducting heavily, the voltage drop across it becomes less than the voltage drop across DC motor 27 in the emitter of power transistor $Q_6$, and the base-emitter circuit of the power transistor becomes reverse biased, turning off the transistor and stopping motor 27. Therefore, as long as there is no image coincidence, transistor $Q_6$ is conductive and motor 27 scans axis 14; but when image coincidence is attained, the scan of movable optical axis 14 is stopped and pointer 30 indicates the range of the target upon range indicia 31.

The purpose of the integrating means in the circuitry is to make the switching circuit responsive to a maximum in the peak-to-peak amplitudes of the AC signal over a substantial period of time, and not responsive to one or two large peak-to-peak values. This prevents scanning motor 27 from being stopped upon the occurrence of one or two high amplitude swings in the AC signal resulting from random coincidence of minute portions of the images before image coincidence is attained. A few random peaks will not suffice to charge $C_5$ to its peak value. When the images are substantially in complete coincidence, however, there are a large number of high amplitude variations in the AC signal, extending over a period of time, and capacitor $C_5$ charges substantially to the peak value of the resulting rectified pulses.

To resume operation of the range finder and recommence scanning of the movable optical channel, switch $S_1$ is momentarily closed, permitting capacitor $C_6$ to discharge. This drops the emitter voltage of transistor $Q_4$, permitting it and power transistor $Q_6$ to resume conduction.

The elements of the two optical channels and the mechanisms for scanning the movable optical channel and for vibrating mirror 34 are merely illustrative, and any suitable elements or mechanisms may be used. Also, in lieu of a photovoltaic cell, the light sensitive device may equally well comprise a photoresistive cell combined with a potential source to provide a similar alternating voltage output.

If, for some reason, it should be desired to provide manual control over the scanning of the movable optical axis, the range finder is adaptable for use in a non-automatic mode of operation while still retaining the advantages of the unique image coincidence detector. This may be accomplished by opening the feedback loop so that the output of the electronic circuitry no longer controls the range sweeping motor 27, and connecting a signal device of some sort, such as a light or audible device, in place of the motor in the emitter circuit of power transistor $Q_6$, with the signal device being actuated when the transistor is turned off. Then, as the movable optical channel is manually swept, the signalling device indicates image coincidence and range may be read.

A similar arrangement could be used to obtain repeated range measurements, for instance for tracking a moving target. Such an arrangement is provided by opening the feedback loop as in the previous example for the non-automatic mode of operation, and connecting scanning motor 27 to operate continuously. The fixed optical channel is kept trained on the target and the movable optical channel, driven by motor 27, causes the movable axis to repeatedly sweep past the target. An indicator in the final stage of the transistor switching circuitry would provide an indication of the existence of image coincidence during each sweep and the range could be noted at that point either visually or by some automatic recording device.

The range finder provided by this invention is not limited to use with visible light. It may be used with any type of electromagnetic radiation, with the appropriate elements for modifying and responding to that particular wavelength of radiation. In particular, the system is easily adaptable for use as a passive infra-red range indicator utilizing an infra-red sensor in place of the photovoltaic cell.

Another use of the device is as a passive, and therefore undetectable, monitoring device. By providing an alarm device responsive to the scanning of the movable channel and modifying the electronic circuitry slightly so that the system automatically recommences scanning once image coincidence has been destroyed, it is possible to focus the device on a distant target and have the device start to sweep and operate the alarm whenever some object disturbs either of the optical paths to the target. This type of device would be useful both with visible and infra-red radiation.

Other alterations and modifications in the systems such as will suggest themselves to those skilled in the art are considered as being within the scope of the invention, which is defined solely in the claims.

What is claimed is:
1. An automatic image incident range finder comprising in combination:
   first means for receiving a first radiation image of an object ranged upon along a first axis,
   second means set a known distance apart from said first means for receiving a second radiation image of said object along a second axis which intersects said first axis,
   means for superimposing said first and second radiation images received along said first and second intersecting axes,
   screen means upon which said images are superimposed,
   power operated scanning means connected to said second means for varying the relative directions of said intersecting axes with respect to each other,
      whereby the distance of the intersection of said axes from said receiving means is varied;
   control means comprised of radiation responsive means sensitive to variations of intensity of radiation positioned to monitor said screen, and signal producing means responsive to the output of said radiation responsive means to produce a control signal to stop said scanning means when the variations of intensity of radiation received by said radiation responsive means from said screen is a maximum indicating intersection of said axes at the object ranged upon, means to receive said control signal and to stop said scanning means in response thereto,
   range indicating means connected to be responsive to the relative directions of said axes for indicating the distance of the intersection of said axes from said receiving means.

2. An automatic range finder in accordance with claim 1 and wherein:
   said scanning means comprises power-operated reciprocating means mechanically linked to said second means for receiving a radiation image to vary the point of intersection between said second axis and said first axis within set limits; and
   said means responsive to said control signal comprises switch means in series with said power operated scanning means to open and thereby stop said scanning means.

3. An automatic range finder comprising in combination:
   first means for receiving a first radiation image of an object ranged upon along a first axis, second means set a known distance apart from said first means for receiving a second radiation image of said object along a second axis which intersects said first axis,
   means for superimposing said first and second radiation images received along said first and second intersecting axes,
      screen means upon which said images are superimposed;
   power operated means connected to said second means for varying the angle of said second axis with respect to said first axis,
      whereby the distance of the intersection of said axes from said receiving means is varied;
   means for determining when said first axis and said second axis converge upon the object to which the distance is desired comprising
      radiation responsive means to produce a voltage output representative of the radiation intensity focused upon it,
      means to scan said screen and project successive increments of the superimposed images thereon upon said radiation responsive means,
      electrical circuit means connected to receive the output of said radiation sensitive means, to determine when it reaches a maximum, and to produce a control signal to stop said scanning means and means connected to said scanning means and said electrical circuit means to stop said scanning means in response to the output of said electrical circuit means when said output reaches a maximum, whereby said scan is stopped when said first and second axes intersect at said object,
   range indicating means connected to be responsive to the angle of said second axis with respect to said first axis for indicating the distance of the intersection of said axes from said receiving means.

4. An automatic range finder in accordance with claim 3 and wherein said means for determining when said first and second axes converge upon the object to which the distance is desired comprises:
   radiation responsive means for developing an output having a time-varying value which is a function of spatial variations in radiation intensity over a portion of said superimposed images, and
   integrating means for integrating said output over a period of time.

5. An automatic range finder in accordance with claim 4 wherein:
   said radiation responsive means is comprised of photoelectric means the output of which is an alternating voltage which varies in direct proportion to the radiation intensity of the successive increments of said
superimposed images projected thereon;

and said means connected to receive the output of said
radiation sensitive means comprises, means to rectify said alternating voltage output and
obtain therefrom unidirectional voltage pulses,
and capacitive means charged by said voltage pulses;

and said means to stop said scanning means is comprised of switch means connected to said scanning means and responsive to said electrical circuit means to stop said scanning means when said voltage to which said capacitive means is charged reaches a maximum point.

6. An automatic range finder in accordance with claim 4 and wherein said means to scan said screen is comprised of:

lens means to focus successive increments of said superimposed images appearing on said screen upon said radiation responsive means, and vibrating mirror means positioned to effectively sweep a substantial portion of said superimposed images across said lens means.

7. A range finder comprising in combination:

a reflecting surface means; a first optical means having a first axis fixed with respect to said range finder for receiving a first image of a selected remote object and reproducing said first image upon said reflecting surface; means for orienting said range finder so that said first axis intercepts said remote object; a second optical means having a second axis movable with respect to said range finder for receiving a second image of said selected remote object; means for moving said second axis to intercept said remote object; and means for reproducing said second image upon said reflective surface in superimposed relationship with said first image, so that said superimposed images will be substantially coincident when the object represented by said images is positioned at the intersection of said axes;

scanning means to reciprocally vary the relative direction of said second axis connected in said second optical means with respect to said first axis, thereby varying the distance of said intersection of said axes from said range finder;

range indicating means responsive to the orientation of said second movable axis with respect to said first fixed axis for indicating the distance from the intersection of said axes to said range finder;

means to determine when said images are coincident comprising radiation sensitive means to create a voltage output which varies with the intensity of radiation received thereby, third optical means positioned to impose an increment of the superimposed images reflected from said reflecting surface upon said radiation sensitive means comprising power-operated oscillating mirror means to sweep the increment of said images so imposed across a substantial portion of said superimposed images and thereby impose upon said radiation sensitive means variations of radiation intensity characteristic of the image formed by the superposition of said first and second images upon said reflecting means, switching circuit means connected to be responsive to the output of said radiation sensitive means to integrate the output of said radiation sensitive means during the cycle of said scanning means and stop said scanning means when said output is a maximum.

8. A range finder in accordance with claim 7 and wherein said radiation sensitive means comprises photovoltaic means responsive to the time-varying value in radiation intensity of the increments of said superimposed images imposed thereon by said third optical means, to produce a voltage output representative of said time-varying value of radiation intensity and said switching circuit, means for integrating said output over a period of time is comprised of means to receive and rectify said output, capacitor means to store said output, and circuit means to determine when said integrated output commences to decrease.

9. A system for detecting the coincidence of two radiant images superimposed upon a reflecting surface by determining when the variation in intensity of radiation over a substantial portion of said surface is a maximum, comprising:

means for monitoring the surface upon which said two images are superimposed and developing a signal that is a function of the amplitude of variations in the relative intensity of radiation over a substantial portion of said reflecting surface, and means responsive to said signal for detecting a maximum therein.

10. A system in accordance with claim 9 and wherein said radiation monitoring means comprises:

radiation responsive means for developing an output having a time-varying value which is a function of spatial variations in radiation intensity over a substantial portion of said superimposed images, and said means for detecting a maximum in said output comprises integrating means for integrating said output over a period of time.

11. A system in accordance with claim 10 and wherein:

the output of said radiation responsive means comprises an alternating voltage which varies in direct proportion to radiation intensity; and said integrating means comprises means to rectify said alternating voltage output and obtain therefrom unidirectional voltage pulses; and capacitive means to be charged by said voltage pulses toward their peak voltage value.

12. A system in accordance with claim 10 and wherein said radiation responsive means comprises:

means to focus incremental areas of said superimposed images upon the sensitive face of a radiation sensitive transducer means, radiation sensitive transducer means responsive to radiation from incremental areas of said superimposed images imposed thereon by said focussing means, means for supplying an output proportional to the intensity of radiation from said incremental areas; and means for causing said incremental areas to be sequentially and cyclically swept across said sensitive face comprised of oscillating mirror means positioned to sweep said superimposed images across said focussing means.

13. A system for detecting the coincidence of two superimposed radiant images, comprising radiation sensitive transducer means having a sensitive face for supplying an output voltage proportional to the intensity of radiation incident upon said transducer means;

a plurality of radiant energy modifying elements disposed between said transducer means and said images for focusing incremental areas of said images upon said transducer means;

means to move at least one of said radiant energy modifying elements to cause said incremental areas focused upon said transducer to cyclically sweep across the sensitive face of said transducer means, whereby said transducer output comprises a time-varying alternating voltage representative of spatial variations in the intensity of radiation from said superimposed images;

rectifying means connected to said transducer for receiving said time-varying alternating voltage output from said transducer means and rectifying it to produce unidirectional pulses;

integrating means connected to said rectifying means for receiving said unidirectional pulses and integrating them over a period of time; and means connected to said integrating means for detecting a maximum in the output of said integrating means.

References Cited

UNITED STATES PATENTS

| 2,133,241 | 10/1938 | Baker | 88—1 |
| 3,041,459 | 6/1962 | Greene | 88—1 |
| 3,227,033 | 1/1966 | Whyte | 88—1 |

JEWELL H. PEDERSEN, *Primary Examiner.*

F. L. EVANS, *Assistant Examiner.*